United States Patent
Neti et al.

[11] Patent Number: 5,953,701
[45] Date of Patent: Sep. 14, 1999

[54] SPEECH RECOGNITION MODELS COMBINING GENDER-DEPENDENT AND GENDER-INDEPENDENT PHONE STATES AND USING PHONETIC-CONTEXT-DEPENDENCE

[75] Inventors: Chalapathy Venkata Neti, Yorktown Heights; Salim Estephan Roukos, Scarsdale, both of N.Y.

[73] Assignee: International Business Machines Corporation, Armonk, N.Y.

[21] Appl. No.: 09/010,466

[22] Filed: Jan. 22, 1998

[51] Int. Cl.$^6$ ........................................ G10L 5/06
[52] U.S. Cl. .................. 704/254; 704/242; 704/240; 704/252
[58] Field of Search .................. 704/240, 242, 704/252, 254

[56] References Cited

U.S. PATENT DOCUMENTS

| | | | |
|---|---|---|---|
| 5,675,705 | 10/1997 | Singhal | 704/254 |
| 5,787,394 | 7/1998 | Bahl et al. | 704/238 |
| 5,825,978 | 10/1998 | Digalakis et al. | 704/256 |

OTHER PUBLICATIONS

L. R. Bahl et al., "Decision Trees for Phonological Rules in Continuous Speech", S3.9, ©1991 IEEE. pp. 185–188.

L. R. Bahl et al, "Robust Methods For Using Context–Dependent Features And Models In a Continuous Speech Recognizer.", ©1994 IEEE, pp. I–533–I–5336.

Chalapathy V. Neti et al., "Word–Based Confidence Measures As A Guide For Stack Search In Speech Recognition", ©1997 IEEE, pp. 883–886.

Primary Examiner—David R. Hudspeth
Assistant Examiner—Tālivaldis Ivars Šmits
Attorney, Agent, or Firm—Robert P. Tassinari, Jr.

[57] ABSTRACT

A method of gender dependent speech recognition includes the steps of identifying phone state models common to both genders, identifying gender specific phone state models, identifying a gender of a speaker and recognizing acoustic data from the speaker. A method of constructing a gender-dependent speech recognition model includes the steps of providing training data of a known gender, aligning the training data, tagging the training data with a gender to create gender-tagged data, determining a gender question at a node to determine gender dependence of the gender-tagged data, determining a phonetic context question at the node to determine phonetic context dependence of the gender-tagged data, determining a highest value of an evaluation function between the gender dependence and the phonetic context dependence to determine which dependence is a dominant dependence, splitting the data of the dominant dependence into child nodes according to likelihood criteria, comparing the highest value with a threshold value to determine if additional splitting is necessary, repeating theses steps for each child node until the highest value is below the threshold value and counting the nodes having gender dependence to determine an overall gender dependence level. A gender-dependent speech recognition system includes an input device for inputting speech to a preprocessor. The preprocessor converts the speech into acoustic data, and a processor for identifies gender-dependent phone state models and phone state modes common to both genders. The phone state models are stored in a memory device wherein the processor recognizes the speech in accordance with the phone state models.

18 Claims, 3 Drawing Sheets

SPEECH RECOGNITION MODELS COMBINING GENDER-DEPENDENT AND GENDER-INDEPENDENT PHONE STATES AND USING PHONETIC-CONTEXT-DEPENDENCE

BACKGROUND OF THE INVENTION

1. Field of the Invention

This disclosure relates to speech recognition and, more particularly, to gender-dependent models for continuous speech recognition.

2. Description of the Related Art

Gender dependent speech recognition systems are usually created by splitting or fragmenting training data into each gender and building two separate acoustic models one for each gender. Fragmenting assumes that every state of a sub-phonetic model is uniformly dependent on gender. These gender-dependent systems have not yielded any significant improvements to speech recognition. Some important disadvantages of the conventional gender dependent speech recognition systems are 1) fragmenting training data even when unnecessary and 2) the need to store a complete acoustic model for each gender.

Acoustic training data is typically divided into 10 msec segments called frames. Each frame is represented by an acoustic feature vector. For example, a 1 sec duration would contain 100 frames. The sequence of acoustic vectors are aligned to the phonetic transcription of the utterance. Each phone has three states. After alignment, each state has a subset of acoustic vectors associated with each state which can be modeled by Gaussian prototypes.

Current acoustic models are built by querying the surrounding context to model context-dependent variations. For example, the phone ae in the context of cat (k ae t) may be different than ae in married, since the surrounding context in cat (k and t) is different from married (m and r). This context difference does not necessarily mean that the realization is different with respect to gender. However, the realization of ae in the context of cat may vary across gender.

Therefore, a need exists to model gender differences that are not sufficiently modeled by context-dependent variations. There is also a need for a gender dependent speech recognition method which takes advantage of phonetic differences in speech patterns by different genders without fragmenting training data when unnecessary to reduce the amount of storage space required by the speech recognition system.

SUMMARY OF THE INVENTION

A method of gender dependent speech recognition includes the steps of identifying phone state models common to both genders, identifying gender specific phone state models, identifying a gender of a speaker and recognizing acoustic data from the speaker.

In alternate methods, the step of identifying gender further includes the steps of setting the gender to a first gender, calculating a confidence based on the first gender, setting the gender to a second gender, calculating a confidence of the second gender and determining gender by selecting the confidence with a higher value. A likelihood for each gender may be used to determine gender. The steps of calculating the confidences may include calculating the confidence by taking the product of word confidences for every word in a hypothesis. The step of identifying gender may include performing a MAP (maximum a posteriori) adaptation. The step of identifying gender may include comparing Gaussian prototypes to a codebook of Gaussian prototypes to determine gender. The step of comparing Gaussian prototypes may further include clustering Gaussian prototypes to create the codebook of Gaussian prototypes. The step of identifying gender specific phone state models further comprises the step of asking a gender question at a node to determine gender dependence of the acoustic data.

A method of constructing a gender-dependent speech recognition model includes the steps of
 a) aligning acoustic data with a gender independent system,
 b) asking a gender question at a node to determine gender dependence of the acoustic data,
 c) asking a phonetic context question at the node to determine phonetic context dependence of the acoustic data,
 d) determining a highest value of an evaluation function between the gender dependence and the phonetic context dependence to determine which dependence is a dominant dependence,
 e) splitting the data of the dominant dependence into child nodes according to the question of dominant dependence, and
 f) repeating steps b–e for each child node until a threshold criterion is met.

In alternate methods, a step of counting the nodes having gender dependence to determine an overall gender dependence level may be included. The step of repeating steps until a threshold criteria is met may include comparing the highest value with a threshold value to determine if additional splitting is necessary. The step of asking the phonetic context question may include the step of asking the phonetic context question at each position between −5 to +5, inclusive from the node.

Another method of constructing a gender-dependent speech recognition model includes the steps of
 a) providing training data of a known gender,
 b) aligning the training data,
 c) tagging the training data with a gender to create gender-tagged data,
 d) asking a gender question at a node to determine gender dependence of the gender-tagged data,
 e) asking a phonetic context question at the node to determine phonetic context dependence of the gender-tagged data,
 f) determining a highest value of an evaluation function between the gender dependence and the phonetic context dependence to determine which dependence is a dominant dependence,
 g) splitting the data of the dominant dependence into child nodes according to likelihood criteria,
 h) comparing the highest value with a threshold value to determine if additional splitting is necessary, and
 i) repeating steps d–h for each child node until the highest value is below the threshold value.

In alternate methods, the step of counting the nodes having gender dependence to determine an overall gender dependence level may be included. The step of asking the phonetic context question may include the step of asking the phonetic context question at each position between −5 to +5, inclusive from the node.

A gender-dependent speech recognition system includes an input device for inputting speech to a preprocessor. The preprocessor converts the speech into acoustic data, and a processor for identifies gender-dependent phone state models and phone state modes common to both genders. The phone state models are stored in a memory device wherein the processor recognizes the speech in accordance with the phone state models. The gender-dependent phone state models may reduce an amount of memory storage space needed to store the phone state models. The processor may include a computer.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to a method for identifying speech and more particularly to choosing between genders based on gender-dependent sub-phonetic units. Acoustic realizations of various sub-phonetic units are dependent on gender by varying degrees across phones, and, more particularly, the acoustic realizations are context dependent. The method of the present invention includes a gender question in addition to phone context questions in context decision trees. Using these trees, phone-specific gender dependent acoustic models may be employed. The method chooses between genders during processing based on a confidence of a decoded hypothesis.

Context-dependent sub-phonetic models are constructed as follows: each phone is represented by three states, i.e. a start state, a middle state and an end state. Each state is represented by a context-dependent Gaussian mixture model. A binary decision tree is constructed by annotating each of a plurality of centisecond vectors of training data by their state and by their phone context by aligning the data using a speaker independent system. At each level the data is split into two subsets by asking a binary question about the phonetic context $P_i$, for positions i=−1, −2, −3, −4, −5, +1, +2, +3, +4, +5. Letting P denote an alphabet of phones, and $N_p$ the size of the alphabet, each question is of the form: is $P_i$ in S?, where S is a subset of P. Phonologically meaningful subsets of phones commonly used in speech analysis are used, for example S=p, t, k (all unvoiced stops), etc. Each question is applied to each element $P_i$ for i=−1, −2, −3, −4, −5, +1, +2, +3, +4, +5. To select the best question at each node from this set, an evaluation function based on a probabilistic measure related to the homogeneity of a set of parameter vectors at the node is used. One example of this method is set forth in L. Bahl et al. "Decision Trees for Phonological Rules in Continuous Speech", Proceedings of ICASSP-91, Toronto Canada, 1994 which is incorporated herein by reference. For each node, the question is chosen with a highest value of the evaluation function. The growth of the tree is stopped when the value of the evaluation function for the best question is less than a threshold.

Figure 1:
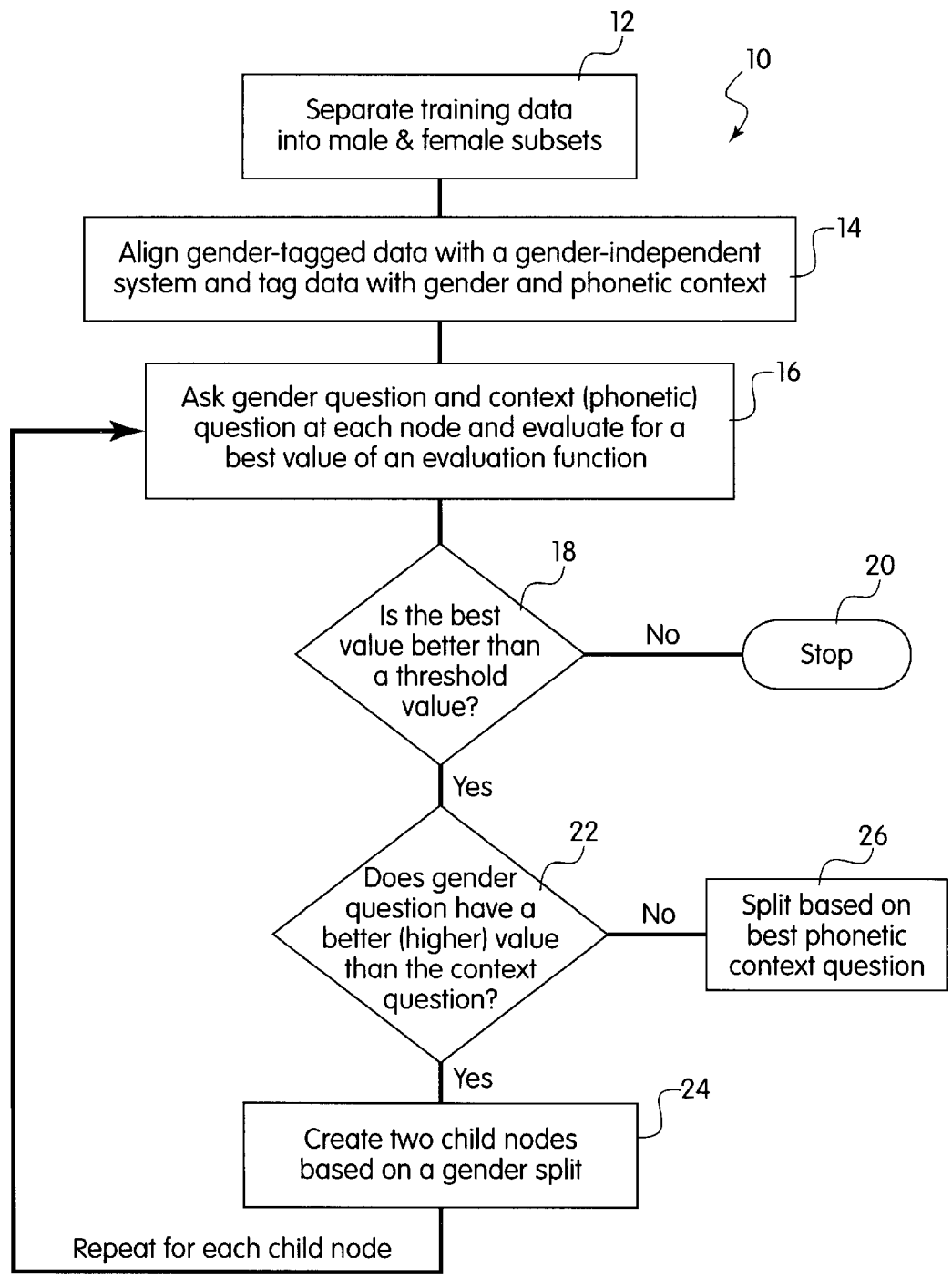
FIG. 1 is a flow chart showing a method for gender-dependent speech recognition in accordance with the present invention.

Referring now to the drawings in which like numerals represent the same or similar components throughout the many views and initially to FIG. 1, a flow chart 10 represents steps for employing the present invention. Briefly describing the steps of FIG. 1, training data is separated into male and female subsets to create gender-tagged training data, in step 12. The gender-tagged training data is aligned using a bootstrap system to obtain phonetic context and gender-tag, in step 14. At each node, a gender question and a phonetic context question is asked by the system in step 16. From the phonetic-context question and the gender question, the question with the best value for the evaluation function is determined in step 18. If the value of the evaluation function for the best question is less than a preset threshold, the method is stopped in block 20. In step 22, it is determined if the gender question is better than the phonetic-context questions. If the gender question is better (i.e. has a higher evaluation function value) the data is split according to gender into two child nodes in step 24 and the path returns to step 16 for each child node. Otherwise, the data is split according to the best phonetic-context question in step 26. More detail for these steps is described herein.

Gender-dependent phone-context trees with an additional question about the gender can be built using training utterances from ARPA ATIS (ARPA (as in the governmental agency) air travel information system) training data. In one illustrative example of the present invention, the number of training utterances was 16223. The utterances were first aligned in accordance with step 12 using a gender-independent bootstrap model using a 52 phone, 3 states per phone, left to right Hidden Markov Models (HMM). Each training utterance includes a centisecond vector of training data defined by its state and its phone. All the vectors that are aligned to a given state were used to construct a context tree for that state using the method step in FIG. 1. Each training utterance is signal processed to get an acoustic vector for every centisecond of speech. Each centisecond must be associated with a phonetic state, i.e., aligned based on the time. Alignment may be performed using a Viterbi Method which provides a method for finding the most likely (based on probability) sequence of phonetic states that produced the sequence of acoustic vectors.

Trees are created by asking a question at a node and splitting the result into leaves (or branches). Each tree is analyzed to determine the level of gender dependence. An estimate of the number of leaves (or branches) that are gender-dependent versus those that are gender-independent and only depend on the phonetic context. If the gender question is asked at a root node of a state tree, then all the leaves originating at that node are gender-dependent. If a gender question is asked at any node in a path to a leaf from the root node, it is a gender-dependent leaf. One tree is built for each state, i.e. 52 phones each having 3 states means 156 trees.

Figure 2:
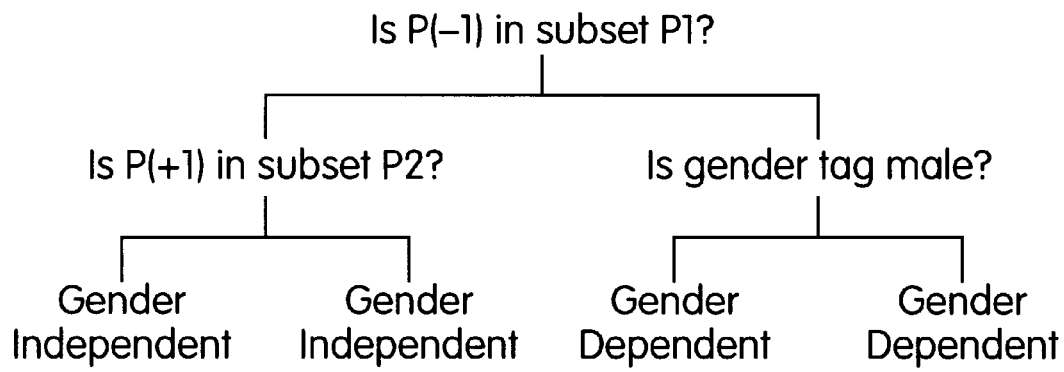
FIG. 2 is a schematic diagram of a context decision tree with a gender question in accordance with the present invention.

Referring to FIG. 2, a schematic is shown of a context decision tree with a gender question. The question posed in FIG. 2 "is P(−1) in subset P1" expands out to "is the first phone to the left of the current phone in phone subset P1".

Similarly "P(+1)" refers to the first phone to the right of the current phone. Note that the rightmost two leaves which have a gender question in their parent node are labeled as gender-dependent, whereas the left two leaves are gender-independent. The phonetic context question is posed for integer positions from −N through +N, (where N is an integer value) in addition to the gender question at each node. In a preferred embodiment N is 5.

Figure 3:
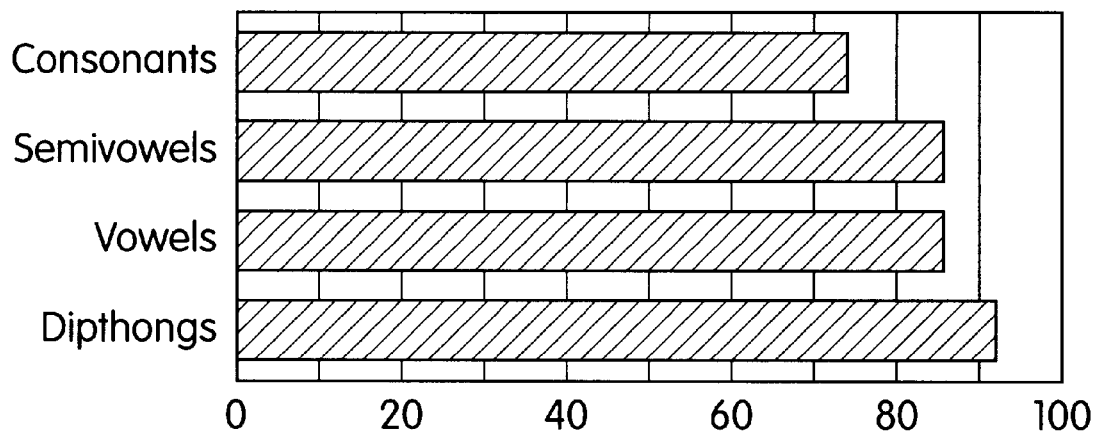
FIG. 3 is a bar chart showing gender dependence as a function of phone group.

Referring to FIG. 3, the extent of gender dependence which is defined as a percentage of leaves of the total number of leaves that are gender dependent for various classes of phones. This percentage is used to determine the overall gender dependence of the phone and or the state. Note that diphthongs have the highest gender dependence followed by vowels, semivowels and consonants. This is consistent with the observation that vocal tract characteristics, in particular length, may be a significant factor in gender differences and phones that are more dependent on vocal tract characteristics (such as diphthongs, vowels and semi-vowels) are likely to be more gender dependent.

At a more detailed level, the gender dependence ranges from 0 to 100%. The states of phones that are 100% dependent on gender include vowels like AE (as in Br_a_d, middle and end states), AH (as in B_US_, middle and end stated), AY (as in BUY, middle and end states), ER (as in C ER_TAIN, middle and end states), EY (as in A, all states), IY (as in CH_EA_P, all states), NG (as in KI_NG_, start and middles states); diphthongs OW (as in G_O_); fricatives S and Z; Stop T; and liquid Y (as in _Y_ORK, middle and end states).

Using the Models to Recognize Speech:

In conventional gender dependent systems, a complete male model and a complete female model are required. With the gender-dependent model in accordance with the present invention, a common model for both genders is used, and in addition a gender-dependent data set stores only gender-dependent information. For example, if the storage space required for a male model is 1 and a female model 1 for the conventional gender-dependent system, the total space required is 2 (1+1). For the present invention the relative space requirement is only about 1.1 which results in a storage space savings of about 45%.

Figure 4:
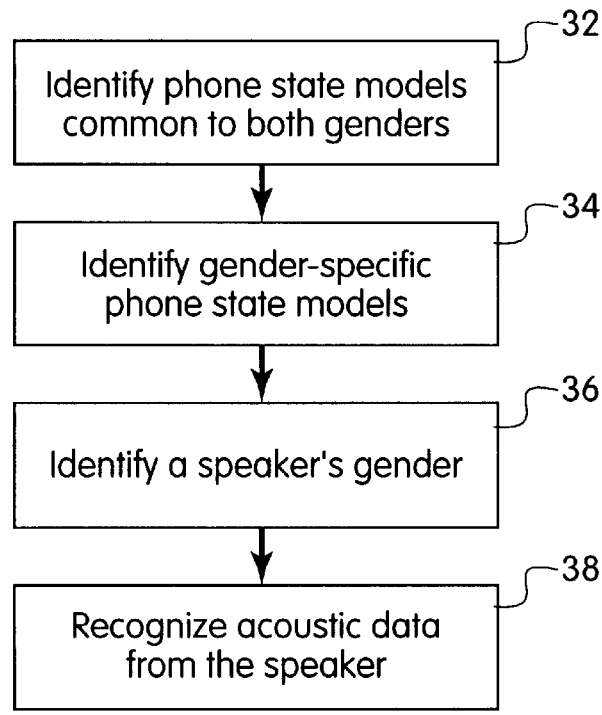
FIG. 4 is a flow chart showing a method of gender dependent speech recognition in accordance with the present invention.

Referring to FIG. 4, a method for speech recognition using gender based models in accordance with the present invention includes the following steps. In step 32, phone state models are identified common to both genders. In step 34, gender specific phone state models are identified. A speaker's gender is identified in step 36. The acoustic data is than processed for speech recognition in step 38.

Since the phone context trees include a question about the gender, a method is required to either determine the gender of the utterance being processed or process using both genders and define a method for choosing the gender that fits best. The gender-dependent models of the present invention reduce the amount of storage space needed to recognize speech. Different approaches may be employed to chose the gender that fits best. One approach does a gender identification (gender ID) prior to processing using the whole utterance.

Figure 5:
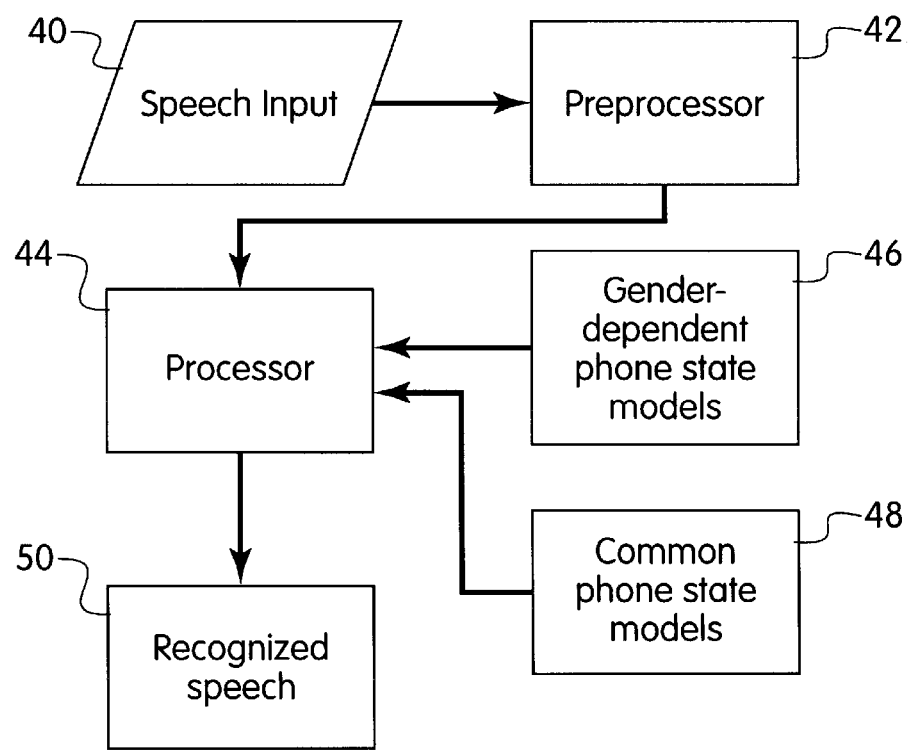
FIG. 5 is a block/flow diagram showing a speech recognition system using gender-dependent phone-state models.

Referring to FIG. 5, an apparatus for implementing gender-dependent speech recognition models is shown. It should be understood that the elements shown in FIG. 5 may be implemented in various forms of hardware, software or combinations thereof. Preferably, these elements are implemented in software on one or more appropriately programmed general purpose digital computers having a processor and memory and input/output interfaces. As shown in FIG. 5, a speech input device 40 receives speech to be recognized. A preprocessor 42 partitions the speech into frames and prepares the speech for recognizing by converting the speech to acoustic data or vectors. A processor 44 performs functions which include aligning the acoustic data or asking gender questions to create gender-dependent models. Processor 44 identifies phone state models which are gender dependent and common to both genders during speech recognition. These models are stored in memory storage devices 46 and 48, respectively. Processor 44 uses the phone state models to more efficiently recognize the speech and output the recognized speech to a memory storage device or other output device 50. Processor 44 may also calculate likelihoods, confidences, etc. as described in more detail herein.

Gender ID:

To understand the effect of gender ID accuracy on the recognition accuracy, two methods may be used:

In the first method for gender ID called state-dependent gender ID (or SDGid), a gender-dependent model may be built by doing a maximum a posteriori (MAP) adaptation of the gender specific training utterances starting with a speaker-independent (SI) system. The whole utterance is aligned using the SI system.

Acoustic training data is typically divided into 10 msec segments called frames. Each frame is represented by an acoustic feature vector. For example, a 1 sec duration would contain 100 frames. The sequence of acoustic vectors are aligned to the phonetic transcription of the utterance. Each phone has three states. After alignment, each state has a subset of acoustic vectors associated with each state which can be modeled by Gaussian prototypes. Distances are computed from each vector in an utterance to the corresponding gender-specific sub-phone models as follows: Let x(t) denote the acoustic vector at time t. $\mu^j_{L(t)}(i)$ is the mean of the jth prototype of the context-dependent state L(t) corresponding to the alignment of x(t) and models of gender i. Then, the distance of x(t) to gender i=1, 2 is defined as:

$$dist(i) = \sum_t \min_j 1/N \|x(t) - \mu^j_{L(t)}(i)\|^2$$

where $\|x(t) - \mu^j_{L(t)}(i)\|$ represents the Euclidian distance between two vectors and N is the dimension of the vector. The gender i corresponding to the lowest value of dist(i) is used as the gender tag for the utterance. This method requires sufficient coverage of the phone set in the test utterance and yields poorer gender ID for short utterances. As an example, SDGid is about 62% accurate for 3–8 second utterances.

In a second method for gender ID called state-independent gender ID (or SIGid), a state-dependent codebook of Gaussian prototypes is generated for each gender by completing a bottom up clustering of state-specific Gaussian prototypes. Thus, each gender is represented by a 512 codebook of state-independent gaussians. Let $N^i_j$ represent the jth codebook of the ith class. Then, the distance to each class dist(i) is defined as follows:

$$dist(i) = \sum_t \min_j (-\log P(x_t / N^i_j))$$

As before, gender corresponding to the lowest value of dist(i) is used as the gender tag for the utterance. This method is more accurate for shorter sentences and on a per utterance basis. As an example, SIGid is about 95% accurate.

Two Pass Decoding:

Another approach is to use a two pass decoding with gender set to a first gender (for example, male) for a first pass and the other gender (for example, female) for a second pass. After the two passes the best gender fit is chosen by one of the following methods:

In a first method, a gender is selected based on the highest likelihood. likelihood is calculated by $Pr(w_1^n/A)$, which denotes the probability of a word sequence w of a length n given acoustics A (sequence of acoustic vectors corresponding to the word string).

In a second method, gender is selected based on a confidence rating of a decoded word hypotheses based on confidences of each word in a decoded string. A conditional probability that the current hypothesized word is correct is derived from using additional features during decoding. The word features used herein include the average likelihood of the word per frame, the size of a fast match list that contains the hypothesized word. During search algorithms, a hypothesized word from an acoustic vocabulary (a match list stored in a computer, for example) is matched as a possible extension of the current time. A quick or fast match finds a subset from the vocabulary to crudely match the utterances to create a fast match list. Based on a language model (which defines the probability of words in the fast match list given word history), the fast match list is narrowed. A detailed acoustic model is used to reduce the fast match list further resulting in a set of word string hypotheses. The process is continued until the acoustics are exhausted. The maximum likelihood word string is chosen as the decoded word string for each gender. Given the word confidences for every word in the decoded hypothesis, it may be assumed that the word confidences are independent and compute an utterance confidence as the product of word confidences. The gender that gives the highest confidence (Confidence in Table 2) is chosen.

A method of checking the gender selected from one of the above methods may include choosing a lowest error rate sentence between the two genders (labeled the Lowest-Error in Table 2).

As an example of the above described method, experiments were performed on an ATIS speech recognition task. ATIS is a medium vocabulary (3000 words) spontaneous speech recognition task to for obtaining information about airline travel. A baseline ranks-based left-right context only system was trained using 16,233 training utterances from the ARPA ATIS training data with 2153 context-dependent states and 28,451 Gaussian prototypes. A class-based trigram model was built using the same training utterances.

A test set contained 930 utterances from the ARPA ATIS test set containing 7881 words. A baseline system performance was 5.63% word error. In Table 1, an illustrative example of the recognition results are presented for the methods of gender ID. Note that the accuracy of gender ID has a great impact on recognition accuracy. SIGid yields a 94% accuracy relative to the actual gender or True Gender which is 100%.

TABLE 1

| System | Error Rate (%) | Gender ID Accuracy (%) |
|---|---|---|
| baseline | 5.63 | — |
| SDGid | 9.92 | 62 |
| SIGid | 5.67 | 94 |
| True Gender | 5.3 | 100 |

In Table 2, error rates are presented based on different ways of choosing the best gender after a two-pass gender-dependent recognition. Using the lowest error rate sentence gives an estimate of the best error rate that can be achieved. Using likelihood to choose the best decoded hypothesis appears to give the least improvement. Using Confidence gives about a 6.3% improvement over likelihood.

TABLE 2

| System | Error Rate (%) |
|---|---|
| baseline | 5.63 |
| Likelihood | 5.58 |
| Confidence | 5.27 |
| Lowest-Error | 4.87 |

Table 3 shows a comparison between a conventional method of building gender-dependent models and gender-dependent trees. An equivalent or higher reduction in error is achievable by increasing the complexity of the system (in terms of the number of gaussian prototypes).

TABLE 3

| System | Error Rate (%) | Number of Prototypes |
|---|---|---|
| baseline | 5.63 | 31935 |
| Gender Dependent models (MAP) | 5.3 | 63870 |
| Gender Dependent Trees | 5.27 | 34630 |

Acoustic realizations of various phones are gender-dependent to different degrees based on phonetic-context. The acoustic realizations are not uniformly dependent on gender. This permits a split in data into gender dependent data and gender independent data. The gender independent data may be pooled to reduce memory space, for example.

Having described preferred methods of a novel gender-dependent speech recognition method (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of gender dependent speech recognition comprising the steps of:
   identifying phone state models common to both genders;
   identifying gender specific phone state models;
   identifying a gender of a speaker; and
   recognizing acoustic data from the speaker based on the phone state models.

2. The method of gender dependent speech recognition as recited in claim 1, wherein the step of identifying gender further comprises the steps of:
   setting the gender to a first gender;
   calculating a confidence based on the first gender;
   setting the gender to a second gender;
   calculating a confidence of the second gender; and
   determining gender by selecting the confidence with a higher value.

3. The method of gender dependent speech recognition as recited in claim 2, wherein a likelihood for each gender is used to determine gender.

4. The method of gender dependent speech recognition as recited in claim 2, wherein the steps of calculating the confidences include calculating the confidence by taking the product of word confidences for every word in a hypothesis.

5. The method of gender dependent speech recognition as recited in claim 1, wherein the step of identifying gender includes performing a maximum a posteriori adaptation.

6. The method of gender dependent speech recognition as recited in claim 1, wherein the step of identifying gender includes comparing Gaussian prototypes to a codebook of Gaussian prototypes to determine gender.

7. The method of gender dependent speech recognition as recited in claim 6, wherein the step of comparing Gaussian prototypes includes clustering Gaussian prototypes to create the codebook of Gaussian prototypes.

8. The method of gender dependent speech recognition as recited in claim 1, wherein the step of identifying gender specific phone state models further comprises the step of asking a gender question at a node to determine gender dependence of the acoustic data.

9. A method of constructing a gender-dependent speech recognition model comprising the steps of:
   a) aligning acoustic data with a gender independent system
   b) asking a gender question at a node to determine gender dependence of the acoustic data;
   c) asking a phonetic context question at the node to determine phonetic context dependence of the acoustic data;
   d) determining a highest value of an evaluation function between the gender dependence and the phonetic context dependence to determine which dependence is a dominant dependence;
   e) splitting the data of the dominant dependence into child nodes according to the question of dominant dependence; and
   f) repeating steps b–e for each child node until a threshold criterion is met.

10. The method of constructing a gender-dependent speech recognition model as recited in claim 9, further comprises the step of counting the nodes having gender dependence to determine an overall gender dependence level.

11. The method of constructing a gender-dependent speech recognition model as recited in claim 9, wherein the step of repeating steps until a threshold criterion is met includes:
   comparing the highest value with a threshold value to determine if additional splitting is necessary.

12. The method of constructing a gender-dependent speech recognition model as recited in claim 9, wherein the step of asking the phonetic context question includes the step of asking the phonetic context question at each position between −5 to +5, inclusive from the node.

13. A method of constructing a gender-dependent speech recognition model comprising the steps of:
   a) providing training data of a known gender;
   b) aligning the training data;
   c) tagging the training data with a gender to create gender-tagged data;
   d) asking a gender question at a node to determine gender dependence of the gender-tagged data;
   e) asking a phonetic context question at the node to determine phonetic context dependence of the gender-tagged data;
   f) determining a highest value of an evaluation function between the gender dependence and the phonetic context dependence to determine which dependence is a dominant dependence;
   g) splitting the data of the dominant dependence into child nodes according to a likelihood criterion;
   h) comparing the highest value with a threshold value to determine if additional splitting is necessary; and
   i) repeating steps d–h for each child node until the highest value is below the threshold value.

14. The method of constructing a gender-dependent speech recognition model as recited in claim 13, further comprises the step of counting the nodes having gender dependence to determine an overall gender dependence level.

15. The method of constructing a gender-dependent speech recognition model as recited in claim 13, wherein the step of asking the phonetic context question includes the step of asking the phonetic context question at each position between −5 to +5, inclusive from the node.

16. A gender-dependent speech recognition system comprising:
   an input device for inputting speech to a preprocessor, the preprocessor converting speech into acoustic data; and
   a processor for identifying gender-dependent phone state models and phone state modes common to both genders, the phone state models being stored in a memory device wherein the processor recognizes the speech in accordance with the phone state models.

17. The gender-dependent speech recognition system as recited in claim 16, wherein the gender-dependent phone state models reduce an amount of memory storage space needed to store the phone state models.

18. The gender-dependent speech recognition system as recited in claim 16, wherein the processor includes a computer.

* * * * *